United States Patent [19]

Thomson

[11] 4,326,555
[45] Apr. 27, 1982

[54] BREAKAWAY COUPLING

[75] Inventor: John G. Thomson, Sherwood, England

[73] Assignee: Gall Thomson Maritime Limited, Nottingham, England

[21] Appl. No.: 9,447

[22] Filed: Feb. 5, 1979

[30] Foreign Application Priority Data

Feb. 4, 1978 [GB] United Kingdom ................. 4565/78

[51] Int. Cl.³ ............................................ F16K 13/04
[52] U.S. Cl. .................................... 137/68 R; 137/71; 251/149
[58] Field of Search ...................... 137/68 R, 797, 798, 137/71; 251/149

[56] References Cited

U.S. PATENT DOCUMENTS 2,956,582 10/1960 Pranter ................................. 137/527
4,119,111 10/1978 Allread .............................. 137/68 R
4,127,142 11/1978 Snider ................................ 137/68 R Primary Examiner—Harold W. Weakley
Attorney, Agent, or Firm—Austin R. Miller

[57] ABSTRACT

A breakaway pipe coupling which, in use, is located in the pipeline extending between a movable tanker, such as a sea vessel, and a storage tank. The purpose of the coupling is to provide a weakness in the pipeline so that a pull be exerted on the pipeline which exceeds a predetermined value, the coupling will break and quickly close off the pipeline to prevent spillage.

The coupling includes a main body portion (31) and a breakaway portion (20), valve means (60) in the main body for closing the conduit (14) passing through the coupling, actuation means (70) being provided for operating the valve means to close the conduit (14) on removal of the breakaway portion from the main body portion and dampening means (76, 80) for controlling the rate at which the valve means closes the conduit.

4 Claims, 4 Drawing Figures

BREAKAWAY COUPLING

The present invention relates to a breakaway pipe coupling and is primarily, but not exclusively, intended for marine use.

In the unloading or loading of oil tankers the pipe line extending between the ship and the quayside is subjected to longitudinal pulls due to the motion of the sea. Sometimes these pulls are sufficiently strong to actually fracture and separate a portion of the pipeline. Full flow of oil from the fractured pipeline continues until a valve upstream from the fracture can be closed. This takes time and results in vast quantities of oil spilling into the sea.

According to one aspect of the present invention there is provided a breakaway pipe coupling having a body through which extends a conduit, the body having a breakaway portion and a main body portion, the main body portion housing valve means for closing the conduit, actuating means for operating the valve means to close the conduit on removal of the breakaway portion from the main body portion and dampening means for controlling the rate at which the valve means closes the conduit.

Preferably, the valve means comprises a plurality of petals circumferentially spaced about the conduit, each petal having an arm co-operable with the actuating means and the dampening means. The petals are arranged so that in the closed position their side edges abut one another to define a substantially conical shape, the apex of which is arranged to face in the direction opposite to the direction of flow of fluid through the conduit.

Preferably, the dampening means is an hydraulic arrangement including hydraulic pistons which exhuast through valve means at a controlled rate.

Advantageously, the hydraulic arrangement functions to permit at least two opposed petals to move to their closed position, to form a bridge prior to the other petals.

Reference is now made to the accompanying drawings, in which.

FG. 4 is a schematic axial section of a modified breakaway coupling according to the present invention.

Figure 1:
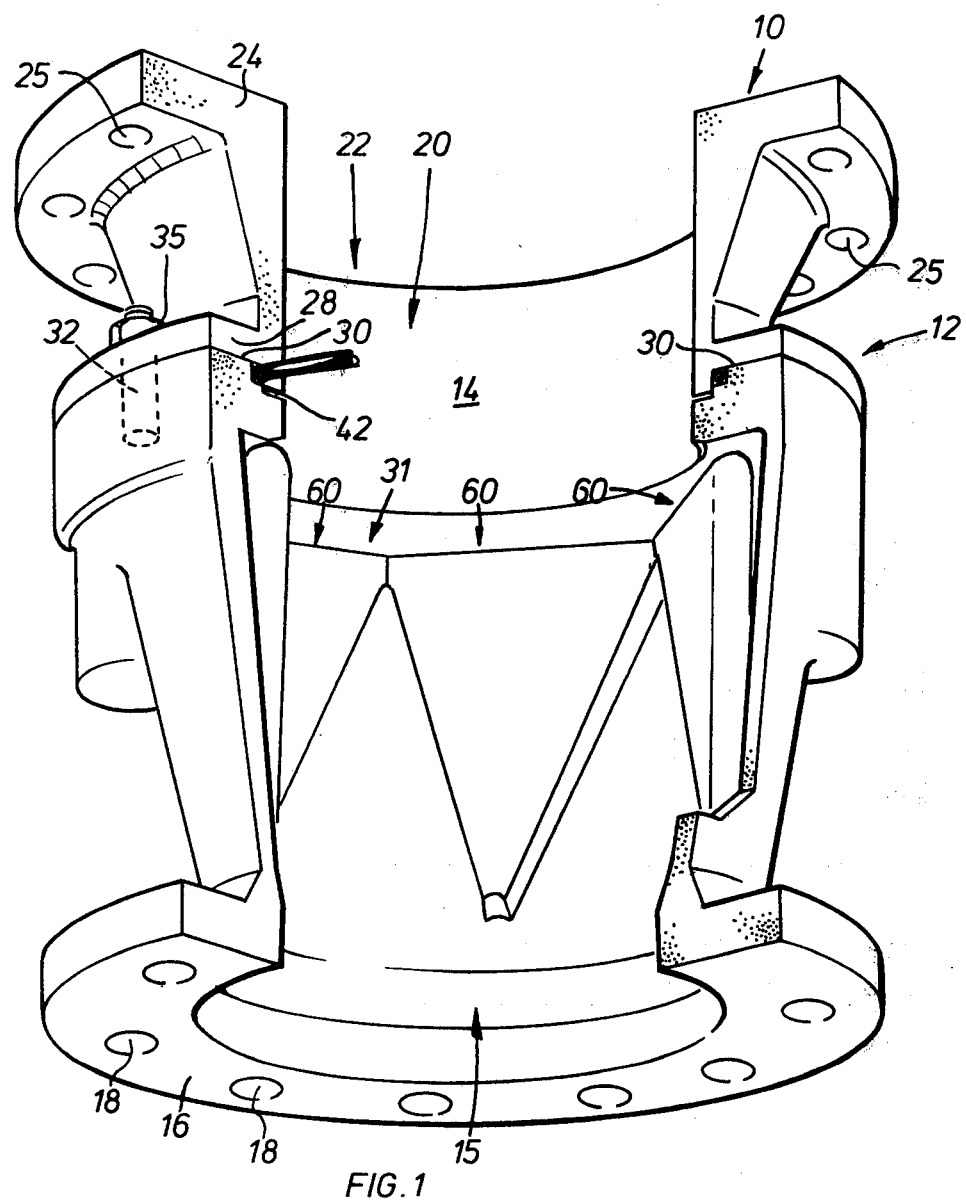
FIG. 1 is a perspective view, partly in section, of a breakaway coupling according to the present invention.

Referring initially to FIG. 1, the coupling 10 includes a body 12 having a conduit 14 extending axially therethrough. The body 12 has a fluid inlet 15 about which extends a flange 16 to which a pipe (not shown) may be bolted using bolt holes 18 in a conventional manner.

The body 12 includes a breakaway portion 20 which has a fluid outlet 22 about which extends a flange 24 having bolt holes 25 for enabling a pipe (not shown) to be connected thereto. Thus the coupling may be located in the loading or unloading pipeline extending between an oil tanker and a quayside.

Figure 3:
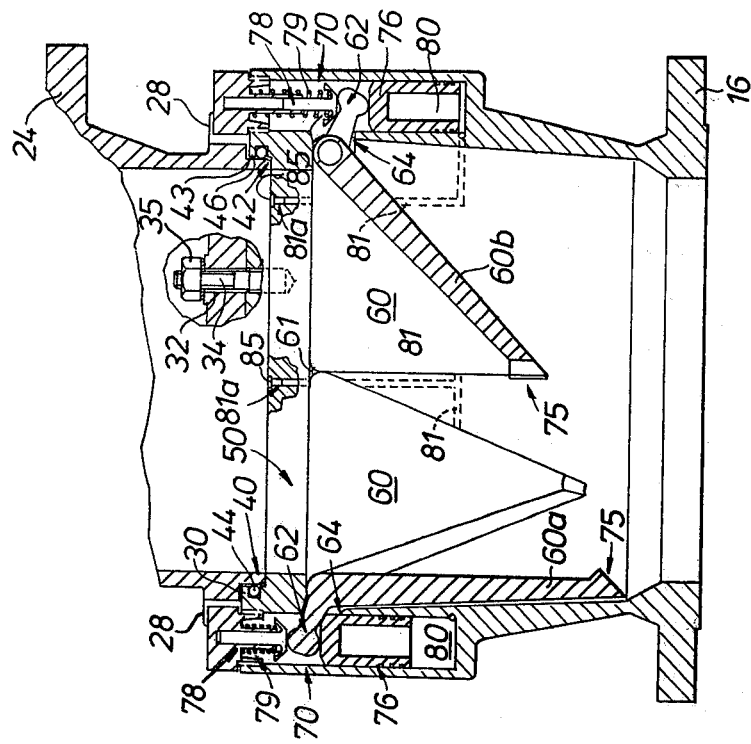
FIG. 3 is an axial sectional view taken along line II—II.

The breakway portion 20 includes a circumferentially extending flange 28 which seats against the circumferentially extending end face 30 of the main body portion 31. End face 30 contains a plurality of internally threaded bores 32 (one of which is shown in FIG. 3) spaced circumferentially about the facae 30. Each bore 32 receives a threaded shaft 34 which is chosen to fracture at a given tensile stress. A nut 35 is received on each shaft 34 so as to fixedly connect the breakaway portion 20 to the main body portion 31.

Projecting axially from flange 28 is a cylindrical projection 40 which seats in a complementary recess 42 formed in the main body portion 31.

An O-ring 44 is located between outer wall 43 of projection 40 and the side wall 46 of recess 42 to provide a seal between the breakaway portion 20 and the main body portion 31.

The main body portion 31 is provided with an inwardly directed flange 50 below which a group of six petals 60 are located. Each petal 60 is pivotally connected to its neighbour by virtue of a spherical bearing 61 which is received in complementary sockets formed in the petals.

Each petal 60 is provided with an arm 62 which projects through an aperture 64 formed in the side wall of the main body portion 31 into an axially extending piston cylinder 70.

Assembly of the petals 60 in the main body portion 31 is threfore simply achieved by locating a first petal threin by passing its arm 62 through an aperture 64 and then placing a spherical bearing in one of its sockets and then locating a second petal adjacent to the first. This procedure is successively repeated until all but the last of the six petals are in position. The last petal is positioned between the first and fifth petal and studs 68 each having a spherical end portion 69 are inserted therebetween to provide pivotal connection between the sixth petal and respectively the first and fifth petal. The studs 68 are threadedly received in the main body portion 31 so that by rotating them to move them radially inwardly it is possible to accommodate the tolerances in the pivotal connections between all the petals.

Figure 2:
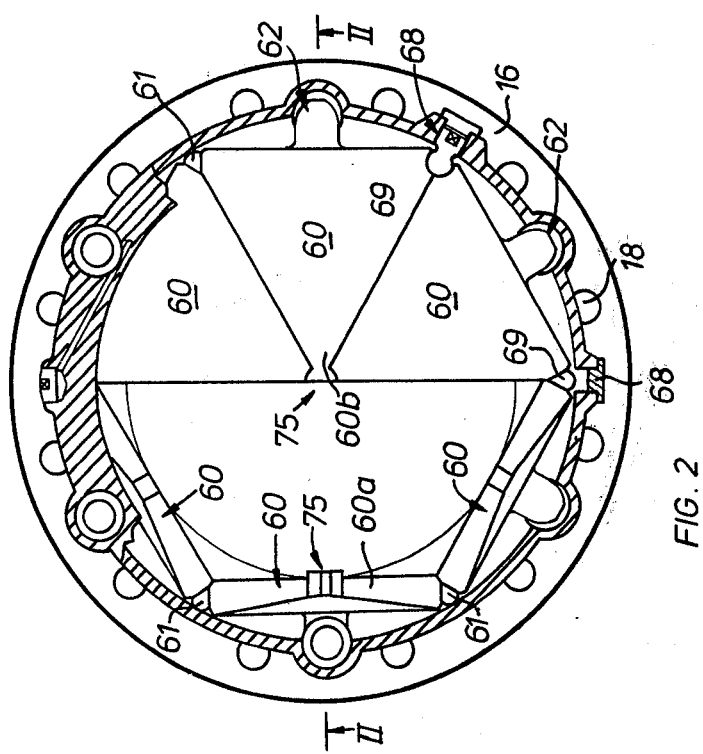
FIG. 2 is a sectional plan view of the coupling of FIG. 1, the petals to the left of the axial centre line being shown in their open position and the petals to the right being shown in their closed position.

The petals 60 are pivotally movable from an open position to a closed position. The open position is indicated by the petals on the left of FIGS. 2 and 3, in which position the petals do not hinder flow of fluid along the conduit 14. The closed position is indicated by the petals on the right hand side of FIGS. 2 and 3, in which position the petals 60 stop flow of fluid along conduit 14. In the closed position, the side edges of each of the petals abut against one another and in this position the petals define a substantially conical shaped closure, the apex of which faces in the direction opposite to the direction of flow of fluid through the conduit.

A pair of diametrically located petals 60a and 60b have complementary end formations 75 which engage one another when petals 60a and 60b are in the closed positions so as to form a bridge across the conduit 14. The bridge serves the purpose of providing a support against which the remaining petals may abut on closing of the conduit 14, thereby enabling the petals to take up loadings on the petals caused by the fluid in conduit 14.

Each petal 60, in use, is held in its open position by virtue of an hydraulic piston 76 located in the piston cylinder 70. The arms 62 of each petal is therefore held in a raised position. Valve actuation means in the form of a plunger 78 is also provided which is biased by a spring 79 to urge the arm 62 to its lowest position and so the spring 79 is compressed when the arms 62 is in its raised position.

Each of the piston chambers 80 communicates with a conduit 81 which opens out onto the bottom wall of recess 42 via a bleed valve 81a.

O-rings 85 are provided for engagement with end face 40a of projection 40 to prevent leakage of hydraulic fluid when the breakaway portion is in position. The bleed valve 81a, associated with each piston chamber is chosen to permit a predetermined flow of fluid therethrough so that the rate at which each piston chamber vents is controlled.

For the chambers 80 associated with petals 60a and 60b the valves 81a are provided with large bores so that these chambers vent rapidly to enable petals 60a; 60b to reach their closed position rapidly before the other petals.

The provision of individual bleed valves for each of the remaining petals enables the rate of closure of each petal to be easily and accurately controlled. Accordingly, it is possible to arrange for the remaining petals to reach the closed position either sequentially or simultaneously.

The piston chambers 80 are pressurised by an external hydraulic pump and if desired a pressure gauge may be provided to monitor the fluid pressure in chambers 80.

As an alternative to venting each chamber 80 through individual bleed valves it is envisaged that chambers 80 associated with petals 60a and 60b may be vented through a common bleed valve and that the chambers 80 associated with the remaining petals may be vented through a separate common bleed valve.

In use, if a pull is exerted on the pipe connected to the breakaway portion 20 which is sufficient to fracture the shafts 34, then the portion 20 will be pulled clear of the main body portion 31.

Consequently, each chamber 80 will be vented due to hydraulic fluid exhausting through the bleed valves 81a due to plungers 78 exerting a downward force on the associated hydraulic pistons 76. Once the petals start to move outwards into conduit 14, the pressure of fluid travelling along conduit 14 also acts to move the petals to their closed positions. Since the bleed valves only permit a certain flow of hydraulic fluid to pass, the petals 60 are restrained from moving to their closed positions too quickly i.e. their movement is dampened by the hydraulic piston exhausting through a bleed valve. This serves to reduce shock waves being sent upstream through the fluid.

Since bleed valve 81b permits a greater flow of fluid therethrough than valve 82b, petals 60a, 60b will be the first to reach their closed position and will form a bridge across the conduit 14. This serves to quickly reduce the flow along the conduit 14 by one third and also provides a support for the other petals which are in the process of moving to their closed positions.

Once all petals have reached their closed positions and have formed the conical shaped closure the conduit 14 is closed and pressure of fluid therein tends to press the petals together ensuring pressurised abutment of their side faces. In the embodiment, illustrated, in the closed position the petals are inclined at about 45° to the axis of conduit 14. The angle of inclination may be less, for instance 30°.

The conduit 14 may be re-opened by re-fitting in position the breakaway piston 20 and pumping fresh hydraulic fluid into the piston chambers 80.

The body 12 may be made of any desired material, e.g. steel, and the shafts 34 may be made of brass or other suitable materials. The breakage point of each shaft 34 is chosen so that, in use, the shafts will break rather than expose the pipes to excessive tensile stresses which may cause stretching or breakage of the pipes.

It is to be appreciated that the number of petals may be more or less than six.

Figure 4:
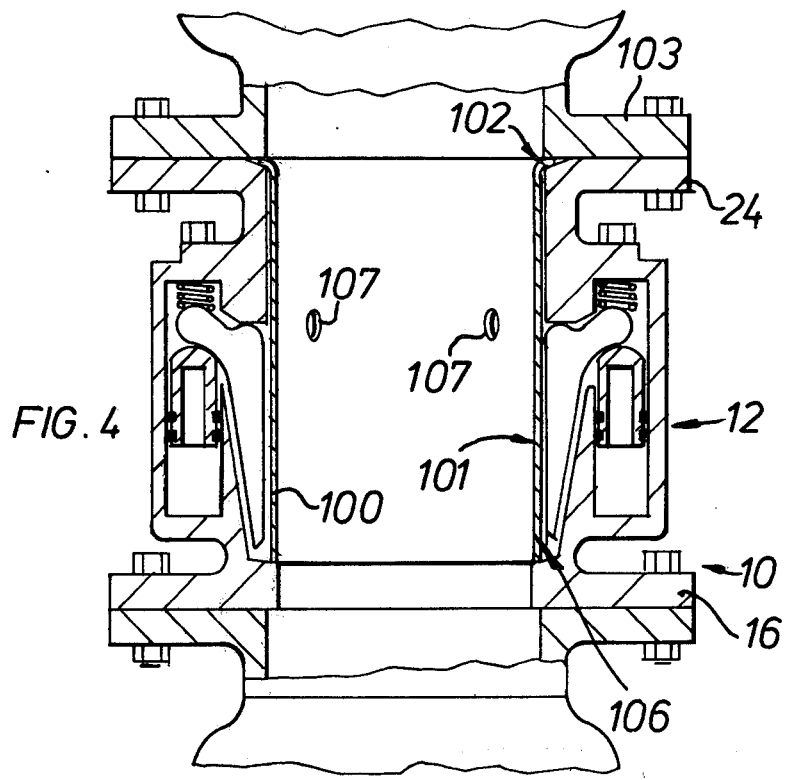

The breakaway coupling 10 shown in FIG. 4 is provided with an internal sleeve 100 which has a tubular body portion 101 and a radially extending flanged portion 102. The flanged portion 102, in use, is sandwiched between the flange 24 and the flange 103 of the connected pipe 104 so that the sleeve is removed on removal of the breakaway portion. The body portion 101 extends toward the flange 16 and provides a smooth walled bore 106 through the coupling 10. The provision of the sleeve 100 makes it possible for a pig to be sent along the pipeline without the danger of it snagging against the petals 60. The body portion 101 is provided with apertures 107 to provide equalisation of fluid pressures either side of the sleeve 100. The sleeve is made of a thin gauge metal to permit to to crush if it is pulled out sideways from the body 12 of the coupling 10.

I claim:

1. In a breakaway pipe coupling having a body through which extends a conduit, said body having a breakaway portion and a main body portion, said main body portion including first valve means for closing the conduit, actuating means for closing said first valve means to close the conduit upon separation of said breakaway portion from said main body portion and damping means for controlling rate at which said first valve means closes, the improvement wherein:

said first valve means includes petals circumferentially spaced about the conduit, said petals defining a conical shape when in a closed position, the apex of said conical shape facing in the direction opposite the fluid flow direction through the conduit; wherein said damping means includes hydraulic pistons and chambers hydraulically asssociated with said plurality of petals and second valve means associated with said hydraulic pistons for controlling rate at which hydraulic fluid vents from said chambers upon separation of said breakaway and main body portions, thereby controlling rate at which petals hydraulically connected with said chambers move towards the closed position; wherein respective second valve means associaed with respective petals are of differing rate, to thereby effect differing closure rates of said respective associated petals, wherein at least two petals are permitted to reach the closed position prior to the remaining petals to thereby form a bridge against which said remaining petals can abut for support on closing the conduit.

2. A coupling according to claim 1 characterised in that each chamber is associated with an individual bleed valve through which it vents upon separation of said breakaway and main body portions.

3. A coupling according to claim 2 characterized in that the main portion and breakaway portions are secured to one another by a plurality of threaded shafts which are chosen to fracture when a predetermined pull is exerted on the coupling.

4. A coupling according to claim 3 wherein the improvement further comprises an axially elongated sleeve, having a radially outwardly projecting lip retained between said breakaway and main body portions at juncture thereof, said sleeve being inboard of said petals when said first valve means is open and extending axially from juncture of said breakaway and main body portions within said main body portion to shield said petals from fluid flowing through said coupling.

* * * * *